US012655755B2

(12) United States Patent
Ferreira

(10) Patent No.: US 12,655,755 B2
(45) Date of Patent: Jun. 16, 2026

(54) SYSTEM AND METHOD FOR SUBSEA WELL LEAK DETECTION AND CONTAINMENT

(71) Applicant: Baker Hughes Energy Technology UK Limited, Bristol (GB)

(72) Inventor: Joel Ferreira, Houston, TX (US)

(73) Assignee: Baker Hughes Energy Technology UK Limited, Bristol (GB)

( * ) Notice: Subject to any disclaimer, the term of this patent is extended or adjusted under 35 U.S.C. 154(b) by 41 days.

(21) Appl. No.: 18/141,184

(22) Filed: Apr. 28, 2023

(65) Prior Publication Data

US 2023/0366312 A1 Nov. 16, 2023

Related U.S. Application Data

(60) Provisional application No. 63/341,207, filed on May 12, 2022.

(51) Int. Cl.
*E21B 47/117* (2012.01)
*E21B 23/06* (2006.01)
(Continued)

(52) U.S. Cl.
CPC ............ *E21B 47/117* (2020.05); *E21B 23/06* (2013.01); *E21B 33/035* (2013.01);
(Continued)

(58) Field of Classification Search
CPC .... E21B 47/117; E21B 43/0122; E21B 47/10; E21B 41/0007; E21B 33/035; E21B 33/0355; E21B 33/037
See application file for complete search history.

(56) References Cited

U.S. PATENT DOCUMENTS 3,347,311 A * 10/1967 Word, Jr. .............. E21B 33/035 166/305.1
4,691,770 A * 9/1987 McLeod ............... E21B 33/128 166/73

(Continued)

FOREIGN PATENT DOCUMENTS

CN 213576857 6/2021
WO 2012/027476 3/2012

(Continued)

OTHER PUBLICATIONS

Mohammad Kadem et al., "Automated Subsea Pipeline Leak Detection Using Real-Time Downhole Gauges," Offshore Technology Conference, Houston, Texas, USA, May 2022, 2 pages.

(Continued)

*Primary Examiner* — Blake Michener
(74) *Attorney, Agent, or Firm* — Hogan Lovells US LLP

(57) ABSTRACT

A leak detection and collection system includes a cap configured to couple to a wellbore component. The system also includes an alert system removably coupled to the cap and a packer coupled to the cap. The packer extends into a bore of the wellbore component and the packer is actuated to seal against the wellbore component and to block flow through the bore. The system further includes a release mechanism coupled to the alert system, a first flow path, an accumulator, and a second flow path. The release mechanism is activated at a first pressure above a first threshold to release the alert system and the second flow path directs flow to the accumulator at a second pressure above a second threshold.

9 Claims, 6 Drawing Sheets

(51) Int. Cl.

| | |
|---|---|
| ***E21B 33/035*** | (2006.01) |
| ***E21B 33/06*** | (2006.01) |
| ***E21B 33/128*** | (2006.01) |
| ***E21B 41/00*** | (2006.01) |
| ***E21B 43/01*** | (2006.01) |
| ***E21B 47/001*** | (2012.01) |
| ***E21B 47/13*** | (2012.01) |
| ***F15B 1/02*** | (2006.01) |

(52) U.S. Cl.
CPC .......... *E21B 33/063* (2013.01); *E21B 33/128* (2013.01); *E21B 41/0007* (2013.01); *E21B 43/0122* (2013.01); *E21B 47/001* (2020.05); *E21B 47/13* (2020.05); *F15B 1/02* (2013.01)

(56) References Cited

U.S. PATENT DOCUMENTS

| | | | | |
|---|---|---|---|---|
| 5,050,680 | A | 9/1991 | Diehl et al. | |
| 5,267,612 | A * | 12/1993 | Cassin | E21B 33/03 138/89 |
| 7,387,012 | B2 | 6/2008 | Spaolonzi | |
| 8,398,334 | B1 | 3/2013 | Doyle | |
| 9,435,179 | B1 * | 9/2016 | McIntyre | E21B 43/0122 |
| 10,451,514 | B2 | 10/2019 | Xu | |
| 11,105,196 | B2 | 8/2021 | Haslanger et al. | |
| 2012/0133525 | A1 * | 5/2012 | Ross | E21B 47/26 340/850 |
| 2013/0118756 | A1 * | 5/2013 | Matsur | E21B 43/0122 166/363 |
| 2014/0262314 | A1 * | 9/2014 | Ray | E21B 43/0122 166/364 |
| 2017/0350234 | A1 * | 12/2017 | Xia | E21B 47/10 |
| 2018/0094519 | A1 * | 4/2018 | Stephens | E21B 47/007 |
| 2020/0284142 | A1 * | 9/2020 | Haslanger | E21B 43/0122 |
| 2021/0071519 | A1 * | 3/2021 | Gordon | E21B 43/0122 |
| 2021/0355807 | A1 * | 11/2021 | Ferreira Moreira | E21B 41/0007 |
| 2022/0003105 | A1 * | 1/2022 | Verissimo | G01M 3/08 |

FOREIGN PATENT DOCUMENTS

| | | | | |
|---|---|---|---|---|
| WO | WO-2020056479 A1 * | 3/2020 | | E21B 33/035 |
| WO | 2022/020536 | 1/2022 | | |
| WO | WO-2022010777 A2 * | 1/2022 | | E21B 44/00 |

OTHER PUBLICATIONS

Qingqing Xu et al., "Acoustic detection technology for gas pipeline leakage," Process Safety and Environmental Protection, Jul. 2013, vol. 91, No. 4, pp. 253-261.

Third Party Observation issued in PCT Application No. PCT/EP2023/025225, dated Sep. 6, 2024.

* cited by examiner

SYSTEM AND METHOD FOR SUBSEA WELL LEAK DETECTION AND CONTAINMENT

CROSS-REFERENCE TO RELATED APPLICATIONS

This application claims priority to and the benefit of U.S. Provisional Patent Application No. 63/341,207, filed May 12, 2022, and titled "SYSTEM AND METHOD FOR SUBSEA WELL LEAK DETECTION AND CONTAINMENT," the full disclosure of which is hereby incorporated by reference in its entirety for all purposes.

BACKGROUND

1. Field of the Disclosure

The present disclosure relates to wellbore operations. Specifically, the present disclosure relates to systems and methods for monitoring wells, such as subsea wells for leaks. The present disclosure may also relate to systems and methods for passive leak detection and containment.

2. Description of Related Art

Oil and gas operations may be conducted in a variety of locations, such as subsea or surface environments, where components are installed on a rig or sea floor. Over time, wells may be less productive and production may be slowed or stopped. Operators may temporarily or permanently abandon these wells. When wells are abandoned, regulators may require periodic monitoring to ensure there is no leakage from the wells. Currently, reactive systems may be utilized to monitor for leaks, which may lead to detection of leaks only after containment from the surrounding environment has been broken. Not only is this undesirable from an environmental perspective, reactively identifying leaks may also be costly for operators and pose a reputational risk.

SUMMARY

Applicant recognized the problems noted above herein and conceived and developed embodiments of systems and methods, according to the present disclosure, for leak detection and containment.

In an embodiment, a leak detection and collection system includes a cap configured to couple to a wellbore component associated with a well. The system also includes an alert system removably coupled to the cap. The system further includes a packer coupled to the cap and extending into a bore of the wellbore component, the packer being actuated to seal against the wellbore component and to block flow through the bore. The system includes a release mechanism coupled to the alert system. The system also includes a first vent extending through the packer, the first vent to permit flow to the release mechanism. The system further includes an accumulator. The system includes a second vent extending through the packer, the second vent to permit flow to the accumulator. The release mechanism is activated at a first pressure above a first threshold to release the alert system from the cap and the second vent permits flow to the accumulator at a second pressure above a second threshold.

In an embodiment, a well sensing cap includes a body secured to a wellbore component, the wellbore component associated with a well, a packer being attached to the body to activate within the wellbore component and to seal a bore of the wellbore component, wherein a pressure from the well is used to activate a release mechanism associated with an alert system, the pressure being maintained within a controlled environment after the alert system is decoupled from the body.

In an embodiment, a leak detection and collection system includes a cap configured to couple to a wellbore component associated with a well. The system also includes an alert system removably coupled to the cap. The system further includes a packer coupled to the cap and extending into a bore of the wellbore component, the packer being actuated to seal against the wellbore component and to block flow through the bore. The system also includes a release mechanism coupled to the alert system. The system includes a first flow path extending through the packer, the first flow path to direct flow to the release mechanism. The system includes an accumulator. The system further includes a second flow path to direct flow to the accumulator. In one or more embodiments, the release mechanism is activated at a pressure above a first threshold to release the alert system from the cap and the second flow path directs flow to the accumulator at a pressure above a second threshold.

In an embodiment, a well sensing cap includes a body secured to a wellbore component, the wellbore component associated with a well, a packer being attached to the body to activate within the wellbore component and to seal a bore of the well, wherein a pressure from the wellbore is used to activate a release mechanism associated with an alert system that is releasably coupled to the body, the pressure being maintained within a controlled environment after the alert system is decoupled from the body.

In an embodiment, a method includes providing a cap associated with a leak detection system, the cap including an alert system. The method also includes coupling the cap to a component of a wellbore. The method further includes determining a pressure, associated with a leak, exceeds a threshold. The method also includes receiving a notification indicative of the leak.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
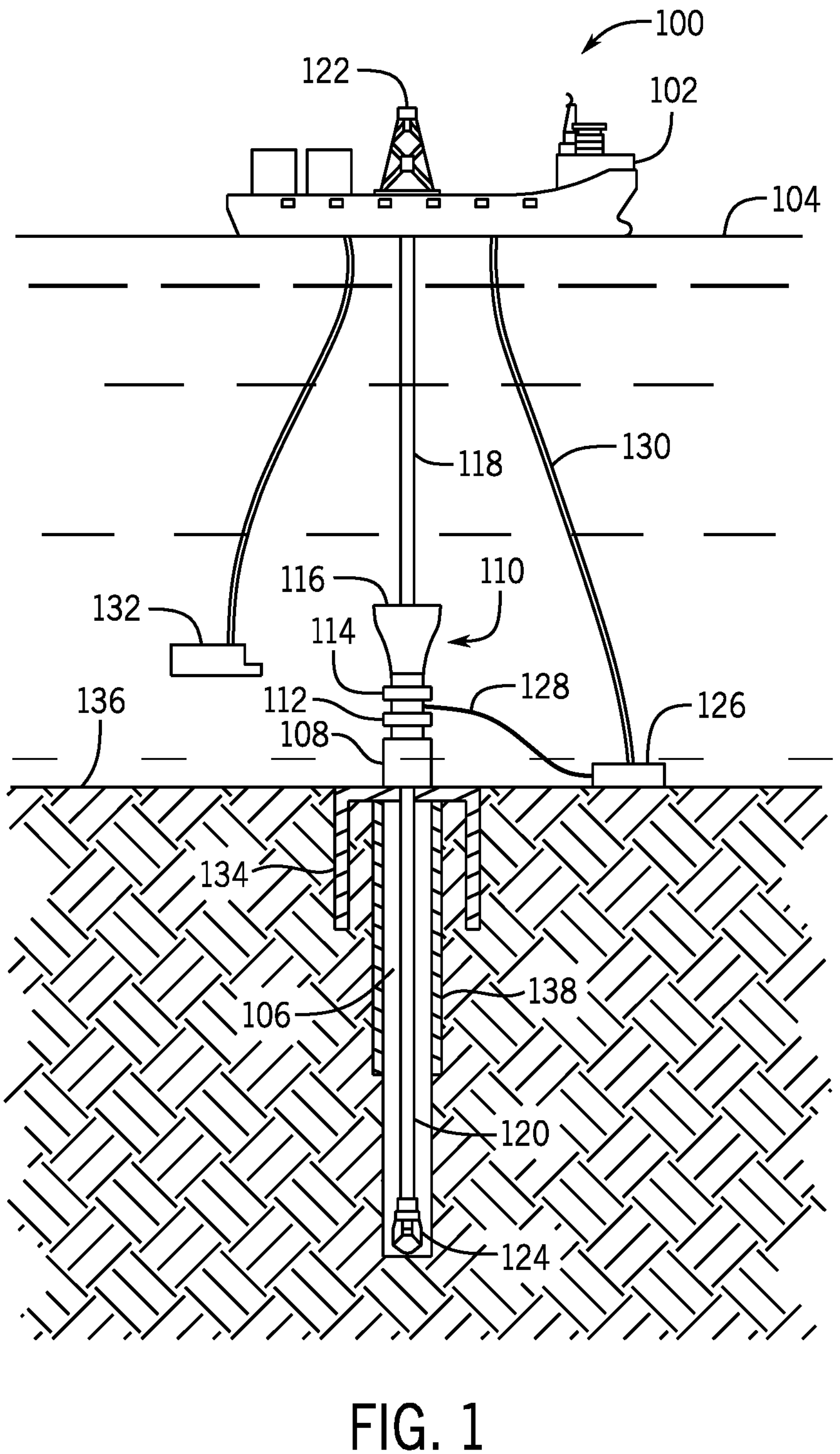
FIG. 1 is a schematic side view of an embodiment of an offshore drilling operation, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. It should be further appreciated that terms such as approximately or substantially may indicate +/−10 percent.

Embodiments of the present disclosure are directed toward systems and methods to proactively monitor and contain leakage from wellbores, such as those used in a subsea environment. Various embodiments may be directed toward a contain configuration (e.g., a containment configuration, a containment system, a containment assembly, etc.), which may also be referred to as a cap, that may be arranged over a portion of a subsea system, such as a subsea tree, a casing profile, a wellhead profile, or the like. The system may include a connector to join the cap to a component, which may be a downhole component, a subsea component, a surface component, and/or the like, where the connector may be activated by a variety of methods, such as hydraulically. In various embodiments, the system may include a packer that is arranged within a bore of the component, where the packer may be mechanically actuated in order to block or otherwise restrict pressure (e.g., liquid pressure, gas pressure, combinations, etc.) from exiting the downhole component. A monitoring system may be associated with the cap such that a bypass permits a flow of pressure to a release mechanism, where the release mechanism may be set to a particular pressure (e.g., a release pressure, a relief pressure, etc.). If the pressure is below the particular pressure, the system continues to monitor the well. If the pressure exceeds the particular pressure, then a beacon may be released, and subsequently activated, to alert an operator of leakage associated with the well. It should be appreciated that the beacon is provided by way of example only and that various other alert systems may be utilized within the scope of the present disclosure. The alert system may include any system that can, responsive to detection of the leak, provide an indication to one or more monitoring personnel regarding the presence of the leak. A collection mechanism may also be deployed that operates at an activation pressure, which may be greater than the particular pressure. In response to a pressure increase, a flow path to the collection mechanism may be activated, which may permit flow to the collection mechanism. Systems and methods may utilize pressure within the well to activate the beacon and also contain the pressure used to activate the beacon, thereby providing leak detection without exposure (e.g., exposure that is below certain regulatory limits, exposure that is below a set amount, etc) to the surrounding environment. Systems and methods may also utilize the collection mechanism in order to provide time for operators to mobilize and plan a solution to address the leak. In this manner, a system for detection may also actively stop leakage to the environment while operators develop solutions to the leak. The system described herein may also be referred to as a passive monitoring system in that remediation methods, such as containment of the leak within the collection mechanism, may be enabled to block leakage to the environment without operator intervention. Accordingly, leaks may be detected earlier and have a reduced likelihood of breaking containment prior to operator involvement.

Systems and methods may utilize one or more packing units that are both mechanically actuated and also arranged within an "upper" region of the well (e.g., within a tree or within an upper region of casing or a wellhead). The packing units may be polymer units that may be used to conform to or otherwise seal against a variety of different sealing surfaces, which may be corroded or marred due to years of activity. As such, the system provides an advantage over other sealing systems that require a clean or smooth sealing interface, such as many metal-to-metal systems, which may not be suitable for all wells, particularly older wells. The mechanical system may be activated by an remotely operated vehicle (ROV) that may be deployed after installation to activate a drive receptacle, such as one associated with a drive screw. The ROV may then rotate the drive screw to a predetermined position and/or torque value in order to seal the bore of the wellbore component. It should be appreciated that systems and methods may describe the use of a mechanical sealing mechanism, but such a mechanism is provided as a non-limiting example and other methods may also be utilized. For example, the cap may be coupled to the wellbore component via a hydraulic piston, and as result, hydraulic fluid may also be used to set the packing unit, as an example.

Systems and methods may also be utilized with a global monitoring and tracking system that may use one or more satellites to receive signals from beacons associated with the cap. For example, the beacon may be a satellite beacon that transmits a signal upon surfacing after being released from the cap. The signal may include information, such as an identifier for the associated well, GPS tracking of the beacon location, and the like. Thereafter, an alert may be broadcast to the operator to plan and prepare for mitigating actions. While the system may be used in a subsea environment, providing the satellite beacon with identifying information within the transmitted signal accommodates the realities that the beacon is likely to float away from the well after release. Systems may include a tether to keep the beacon within a distance of the well. Moreover, as noted, various embodiments may also be incorporated into surface applications in which the release of the beacon may correspond to transmission of one or more signals and/or release of a notification, which may be an electrical release (e.g., a signal) or a physical release (e.g., one or more devices to illustrate detection of a leak).

Embodiments also permit remediation and further monitoring without breaking containment in the event leaks are detected. For example, one or more passages may be provided to permit flushing of a void space between the well and a packer sealing environment. This void may be flushed with sea water or the like, prior to removing the cap. This may reduce a likelihood of leaking fluids to the environment, thereby providing an improved environmental solution, as well as improved leak monitoring and containment.

FIG. 1 is a schematic view of an embodiment of a subsea well monitoring operation 100. It should be appreciated that one or more features have been removed for clarity with the present discussion and that removal or inclusion of certain features is not intended to be limited, but provided by way of example only. Furthermore, while the illustrated embodiment describes a subsea well monitoring operation, it should be appreciated that one or more similar processes may be utilized for subsea well interventions of surface applications and, in various embodiments, similar arrangements or substantially similar arrangements described herein may also be used in surface applications. The drilling operation includes a vessel 102 floating on a sea surface 104 substantially above a wellbore 106. A wellbore housing 108 sits at the top of the wellbore 106 and is connected to a blowout preventer (BOP) assembly 110, which may include shear rams 112, sealing rams 114, and/or an annular ram 116. One purpose of the BOP assembly 110 is to help control pressure in the wellbore 106. The BOP assembly 110 is connected to the vessel 102 by a riser 118. During drilling operations, a drill string 120 passes from a rig 122 on the vessel 102, through the riser 118, through the BOP assembly 110, through the wellhead housing 108, and into the wellbore 106. It should be appreciated that reference to the vessel 102 is for illustrative purposes only and that the vessel may be replaced with a floating platform or other structure. The lower end of the drill string 120 is attached to a drill bit 124 that extends the wellbore 106 as the drill string 120 turns. Additional features shown in FIG. 1 include a mud pump 126 with mud lines 128 connecting the mud pump 126 to the BOP assembly 110, and a mud return line 130 connecting the mud pump 126 to the vessel 102. A remotely operated vehicle (ROV) 132 can be used to make adjustments to, repair, or replace equipment as necessary. Although a BOP assembly 110 is shown in the figures, the wellhead housing 104 could be attached to other well equipment as well, including, for example, a subsea Christmas tree, a spool, a manifold, or another valve or completion assembly.

One efficient way to start drilling a wellbore 106 is through use of a suction pile 134. Such a procedure is accomplished by attaching the wellhead housing 108 to the top of the suction pile 134 and lowering the suction pile 134 to a sea floor 136. As interior chambers in the suction pile 134 are evacuated, the suction pile 134 is driven into the sea floor 136, as shown in FIG. 1, until the suction pile 134 is substantially submerged in the sea floor 136 and the wellhead housing 108 is positioned at the sea floor 136 so that further drilling can commence. As the wellbore 106 is drilled, the walls of the wellbore are reinforced with concrete casings 138 that provide stability to the wellbore 106 and help to control pressure from the formation. It should be appreciated that this describes one example of a portion of a subsea drilling operation and may be omitted in various embodiments. In at least one embodiment, systems and methods of the present disclosure may be used for drilling operations that are completed through a BOP and wellhead, where a casing hanger and string are landed in succession.

Embodiments of the present disclosure may be related to systems after operations with the wellbore 106 are completed, such as temporary or permanent abandonment. For example, various components may be removed from the wellbore 106 after abandonment, but the wellbore housing 108, BOP assembly 110, and/or a subsea tree may remain. In at least one embodiment, a cap of the present disclosure may be coupled to one or more wellbore components, such as but not limited to, the wellbore housing 108, the BOP assembly 110, and/or a subsea tree. It should be appreciated that the cap may be manufactured to have a variety of different profiles and may accommodate different potential landing locations. The cap may be positioned and remain at the seafloor to continue to monitor the well for leaks. Furthermore, the cap may form part of an assembly or may include other sub-components. As will be described below, systems and methods may proactively monitor the well for leaks by utilizing pressures acquired from leaks to activate alert systems to provide information to operators regarding leakage. Additionally, systems and methods may include temporary collection systems so that operators may have time to address leaks, mobilize equipment, and complete remediation operations.

Figure 2A:
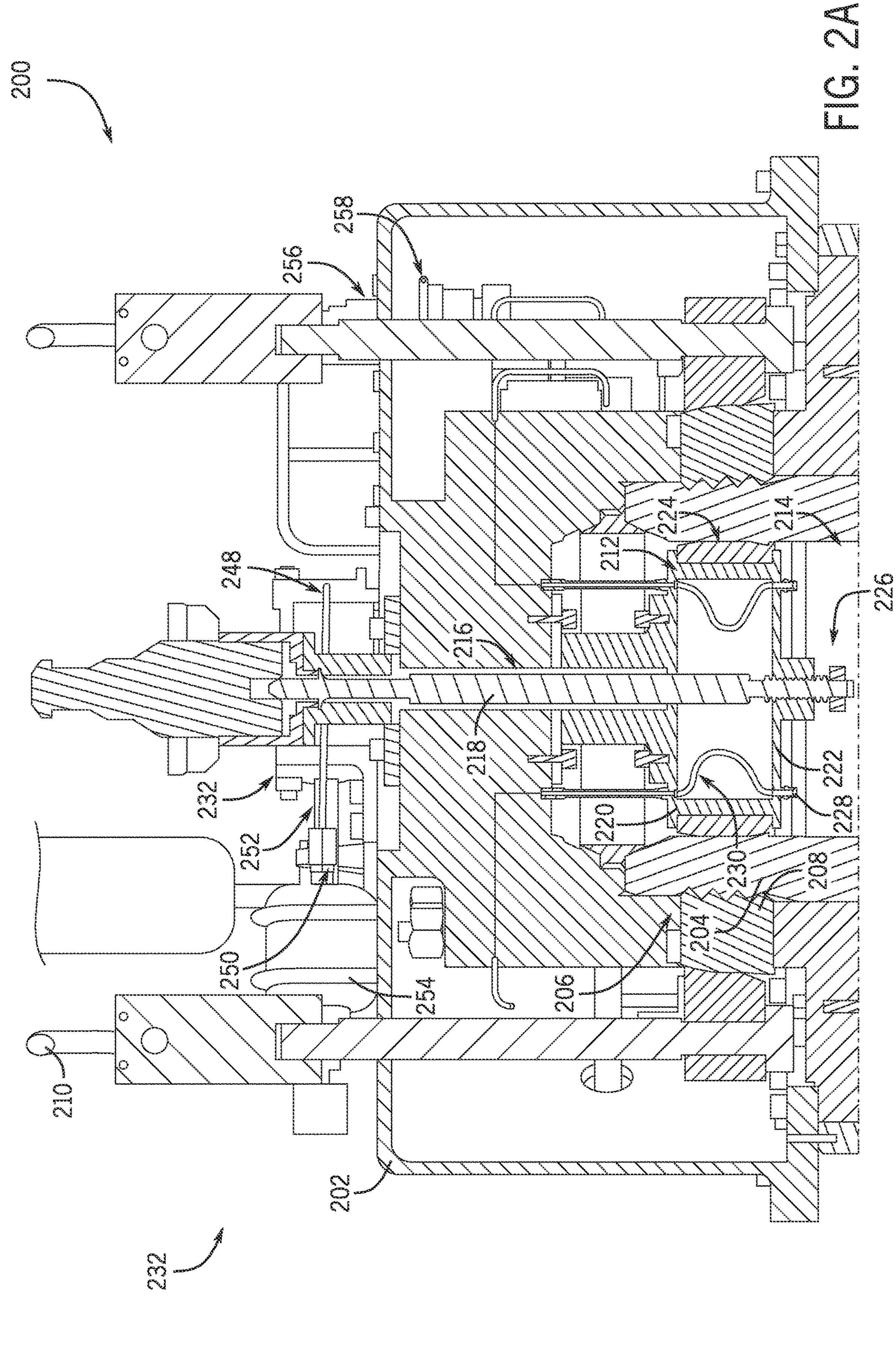
FIG. 2A is a schematic cross-sectional view of an embodiment of a leak detection and collection system, in accordance with embodiments of the present disclosure.

FIG. 2A is a cross-sectional view of an embodiment of a leak detection and collection system 200. The system 200 may include one or more sub-components and/or subassembly that, in operation, may be used to detect and collect leakage from one or more wellbores. In at least one embodiment, different components in the system may be removed and/or additional components may be added based, at least in part, on operating conditions. In various embodiments, the system 200 includes a cap 202 (e.g., a well sensing cap, connector cap, etc.) that is positioned over one or more wellbore components 204. In this example, the wellbore component 204 is a subsea tree mandrel, but it should be appreciated that systems and methods may be utilized with different wellbore components, which may have different sizes and landing profiles, and that features of the cap 202 may be particularly selected and adjusted based on anticipated wellbore components 204. The cap 202 may be coupled to the wellbore components 204, as described herein, and in various embodiments may surround and/or enclose at least a portion of the wellbore components 204. For example, in at least one embodiment, the cap 202 is an annular component that is arranged around the annular wellbore component 204 such that an opening to the wellbore component 204 is surrounded and/or covered by the cap 202.

In this example, the cap 202 includes a connector section 206 having one or more subsea connector dogs 208 for securing the cap 202 to the wellbore component 204. The dogs 208 are provided by way of example and other mechanisms may be used, such as locking clamp segments, threaded fittings, and the like. In at least one embodiment, the subsea connector dogs 208 are hydraulically actuated, for example via a hydraulic line 210. For example, hydraulic fluid may actuate a piston to drive the dogs 208 toward the wellbore component 204 and secure the cap 202 to the wellbore component 204. In the embodiment shown in FIG. 2A, the dogs 208 are engaged with the wellbore component 204 such that one or more features of the dogs are interlocking or otherwise interacting with one or more mating features of the wellbore component 204. Prior to the position shown It should be appreciated that the dogs 208 are provided by way of example only and that alternatives may also be utilized in place or, or in addition to, the dogs 208, such as one or more snap fingers, among other options.

Prior to engagement of the dogs 208, as shown in FIG. 2A, the dogs 208 may be positioned in a radially outward position with respect to the wellbore component 204 such that the dogs 204 are closer to an outer diameter of the cap 202 than the wellbore component 204. Thereafter, the hydraulic fluid may enter one or more chambers and drive an arm, in a downward direction such that a sloped edge of the arm contacts the dogs 208 and drives the dogs 208 radially inward toward the wellbore component 204. Alternatively, as noted, different methods may also be deployed to set the dogs 208, such as threaded fittings, electronic actuators, and/or the like.

In this example, a seal sub 212 extends into a bore 214 of the wellbore component 204. The seal sub 212 may correspond to a polymer downhole packer that includes one or more activation mechanisms 216. It should be appreciated that a variety of packers may be used, including but not limited to, packers with elastomeric seals. In this example, the activation mechanisms 216 include a drive screw 218, a top plate 220, and a bottom plate 222. Upon rotation of the drive screw 218, the plates 220, 222 may be driven toward one another (e.g., the top plate 220 is driven downward and/or the bottom plate 222 is driven upward) so that a packer 224 is compressed and expands radially outward against the bore 214. As a result, the packer 224 may seal against the bore 214 and block pressure from the well in a region below the packer 224. In this example, a void space 226 is formed below the packer 224. Activation of the packer may be accomplished through top-bottom compression, rotational expansion, or the like. As will be described below, leaked pressure may accumulate in the void space 226.

The drive screw 218 may be associated with one or more drive receptacles that extend to a top portion of the cap 202, which has been omitted in this figure for clarity. The ROV 132 may utilize the drive receptacle to set the packer 224. For example, the ROV 132 may interface with the drive receptacle and then cause the drive screw 218 to turn a set amount, such as by counting turns or rotating until an indicator is reached and/or to a known torque value, to set the packer 224. In various embodiments, the drive screw 218 may extend through at least a portion of the packer 224.

It should be appreciated that various other sealing systems may be used in different embodiments and that the packer 224 and associated activation mechanism 216 is provided by way of non-limiting example. The packer 224 may be elastomeric such that it may engage worn or otherwise damaged internal sealing portions of the component 204, which may be present in older wells. Furthermore, using a packer 224 or other sealing system that can deform or otherwise conform to different sealing surfaces may increase a number of wells that can use the system while also enabling sealing configurations without having to particularly design different seal interfaces for each wellbore. In at least one embodiment, the mechanical activation of the packer 224 may be replaced by hydraulic actuation (e.g., by using the hydraulic fluid associated with the dogs 208) and/or electric actuation, among other options. In certain embodiments, one or more pneumatic systems may be used to set the packer 224 and maintain a positive pressure within the packer 224 such that pressures that leak from the wellbore component 204 are contained within the void space 226 and/or directed along particularized flow paths, as described herein.

Figure 2B:
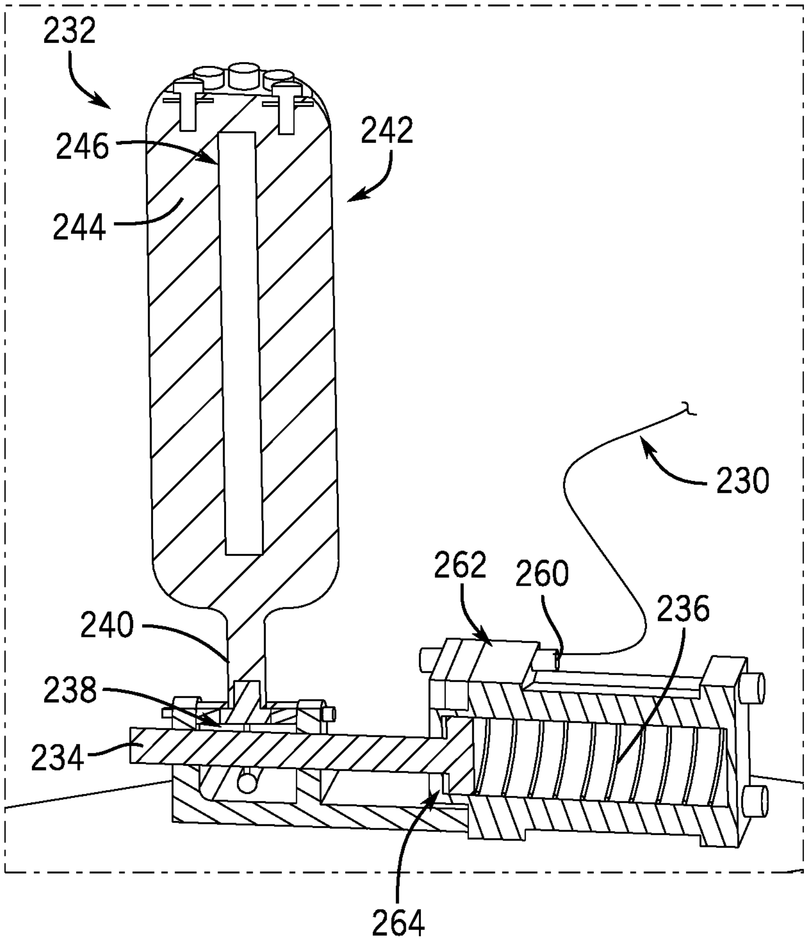
FIG. 2B is a schematic cross-sectional view of an embodiment of an alert system, in accordance with embodiments of the present disclosure.

Further illustrated in the embodiment of FIG. 2A is a first vent port 228. In this example, the first vent port 228 includes a first flow path 230 that extends to a release mechanism 232. FIG. 2B is a cross-sectional view of an embodiment of the release mechanism 232 that may be used with systems and methods of the present disclosure. In this example, the release mechanism 232 is illustrated as a spring release mechanism that includes a pin 234 that is biased toward a closed position via one or more biasing members 236, which in this example is a spring. As pressure builds in the void space 226, it may travel along the first flow path 230 and act on the pin 234 so that when the pressure is sufficient, the force of the biasing member 236 is overcome, thereby driving the pin 234 out of a slot 238 associated with a retainer 240 of an alert system 242. In this example, the alert system 242 includes a buoyancy unit 244 and a satellite beacon 246. Upon release, the buoyancy unit 244 may cause the alert system 242 to float to the surface, where the satellite beacon 246 may transmit a signal indicative of the release of the alert system 242, where the signal may include identification information for the associated well. Accordingly, systems and methods may be directed toward a proactive monitoring system where the pressure associated with a wellbore leak is a driving force to release the alert system 242. In various embodiments, the release mechanism 232 is a sealed system, and therefore, the pressure is not exhausted to the surrounding environment, but is maintained within the cap 202.

At a sufficient pressure, the alert system 242 is released to provide information to an operator indicative of a leak associated with the well. However, it may take time for the operator to mobilize personnel to address the leak, for example when the leak it at an offshore location. Accordingly, systems and methods may also incorporate one or more containment systems to permit the operator time to assembly personnel to address the leak. Returning to FIG. 2A, a second vent port 248 is associated with a non-return valve 250 (e.g., a one-way valve). It should be appreciated that two vent ports are shown by way of example and that, in other embodiments, functionality may still be enabled through the use of a single vent port. Furthermore, locations of the vent ports are also provided as an example and, in various embodiments, the second vent port 248 may be within the cap 248 and not associated with the release mechanism 232. The valve 250 may be set at a certain pressure, such as 200 psi, but any pressure may be utilized with embodiments of the present disclosure. The valve 250 may maintain the leaked pressure within the void space 226 and within the first flow path 230 until a sufficient pressure is reached. Upon reaching the set pressure, a second flow path 252 may direct the pressure (e.g., fluid, gas, etc.) toward an accumulator 254, which may be a bladder type accumulator in various embodiments, by way of non-limiting example. In this manner, leaked fluids may be temporarily contained within the accumulator 254 until the operator can deploy personnel to conduct remediation actions. It should be appreciated that while systems are described as pressure activated, one or more embodiments may also include temperature compensation along with pressure activation or may incorporate temperature sensing or activation of the system.

Various embodiments of the present disclosure further include a dual port hot stab 256, which may be utilized with various features of the cap 202, such as to provide hydraulic fluid along the hydraulic line 210 and/or for chemical injection along a chemical injection port 258, for example for corrosion inhibition. While the dual port hot stab 256 is shown in this example, various other embodiments may include multiple single port hot stabs. It should be appreciated that various other systems may be incorporated into the illustrated cap 202 to facilitate leak monitoring and containment, such as flushing pathways, redundancy, overrides, and the like.

Returning to FIG. 2B, the illustrated release mechanism 232 is shown positioned external, at least partially, to the cap 202, but it should be appreciated that the release mechanism 232 may be integrate within the body of the cap 202 in various embodiments. The first flow path 230 may extend to one or more openings 260 within a body 262 associated with the pin 234 and the biasing member 236. The first flow path 230 may direct pressure to a region 264 to provide pressure against the biasing member 236. The biasing member 236 may be overcome such that the pin 234 may be moved out of the slot 238. Upon movement of the pin 234 by a sufficient amount, the buoyancy unit 244 may be released. Moreover, in certain embodiments, movement of the pin 234 may also provide a path for the pressure to travel along the second flow path 252. For example, a port coupling the region 264 to the second flow path 252 may not be accessible until the pin 234 has moved by a pre-determined amount, which may be greater than the amount necessary to release the buoyancy unit 244. In this manner, different set pressure may be incorporated into the system between release of the buoyancy unit 244 and activation of the accumulator 254.

Figure 3A:
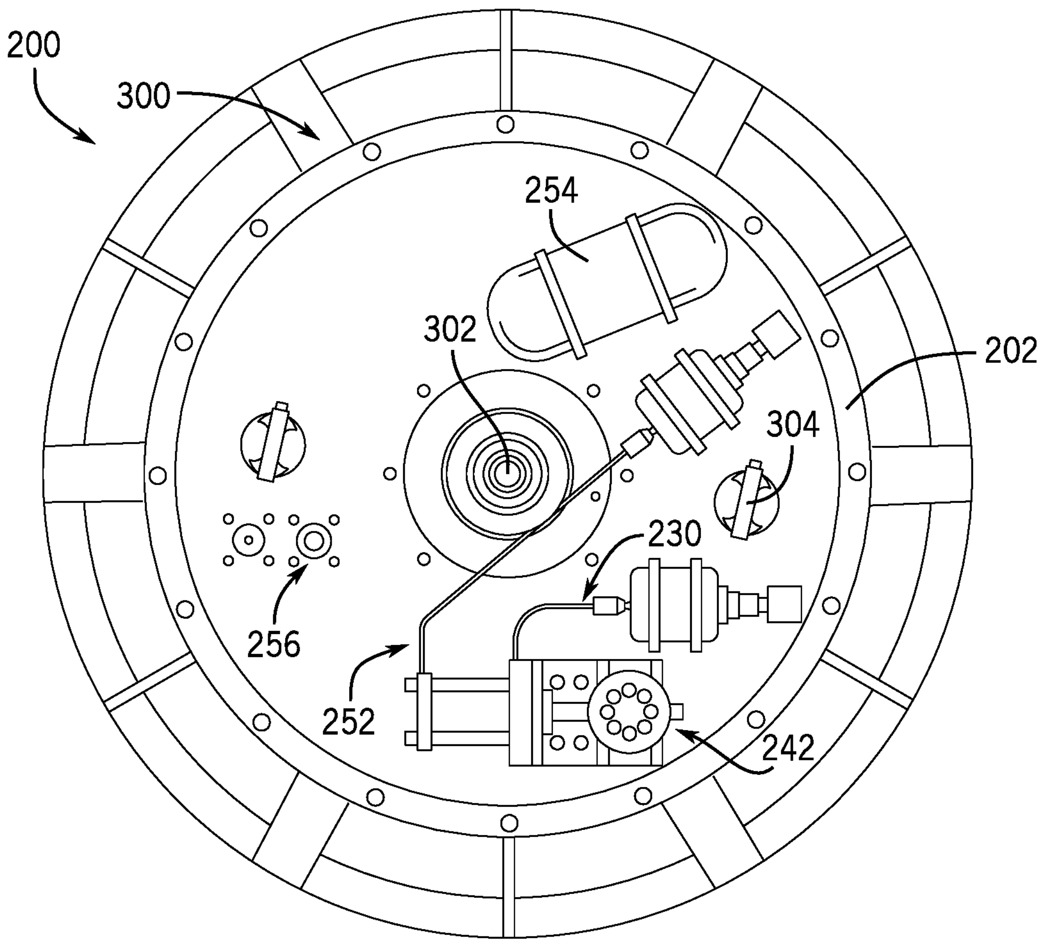
FIG. 3A is a schematic top plan view of an embodiment of a leak detection and collection system, in accordance with embodiments of the present disclosure.

FIG. 3A is a top plan view of an embodiment of the system 200 illustrating an arrangement of components at a top region 300 of the cap 202. It should be appreciated that the arrangement is provided by way of example and is not intended to limit the scope of the present disclosure, as different components may also be arranged at a variety of different locations. In this example, the accumulator 254 is positioned along the top region 300 along with the dual port hot stab 256 and the alert system 242. Further illustrated is a drive receptacle 302, which may enable the ROV 132 to engage the activation mechanism 216, for example via one or more fittings coupled to the drive screw 218. Additionally, the present embodiment includes an override pull 304 (e.g., override rods or similar to enable the ROV to remove the cap in the event of failed hydraulic cylinders).

The illustrated configuration further shows the different flow paths 230, 252 extending out of an interior of the cap 202 and to the top region 300. It should be appreciated that these features may be internal to the cap and are shown external for illustrative purposes and as non-limiting examples.

Figure 3B:
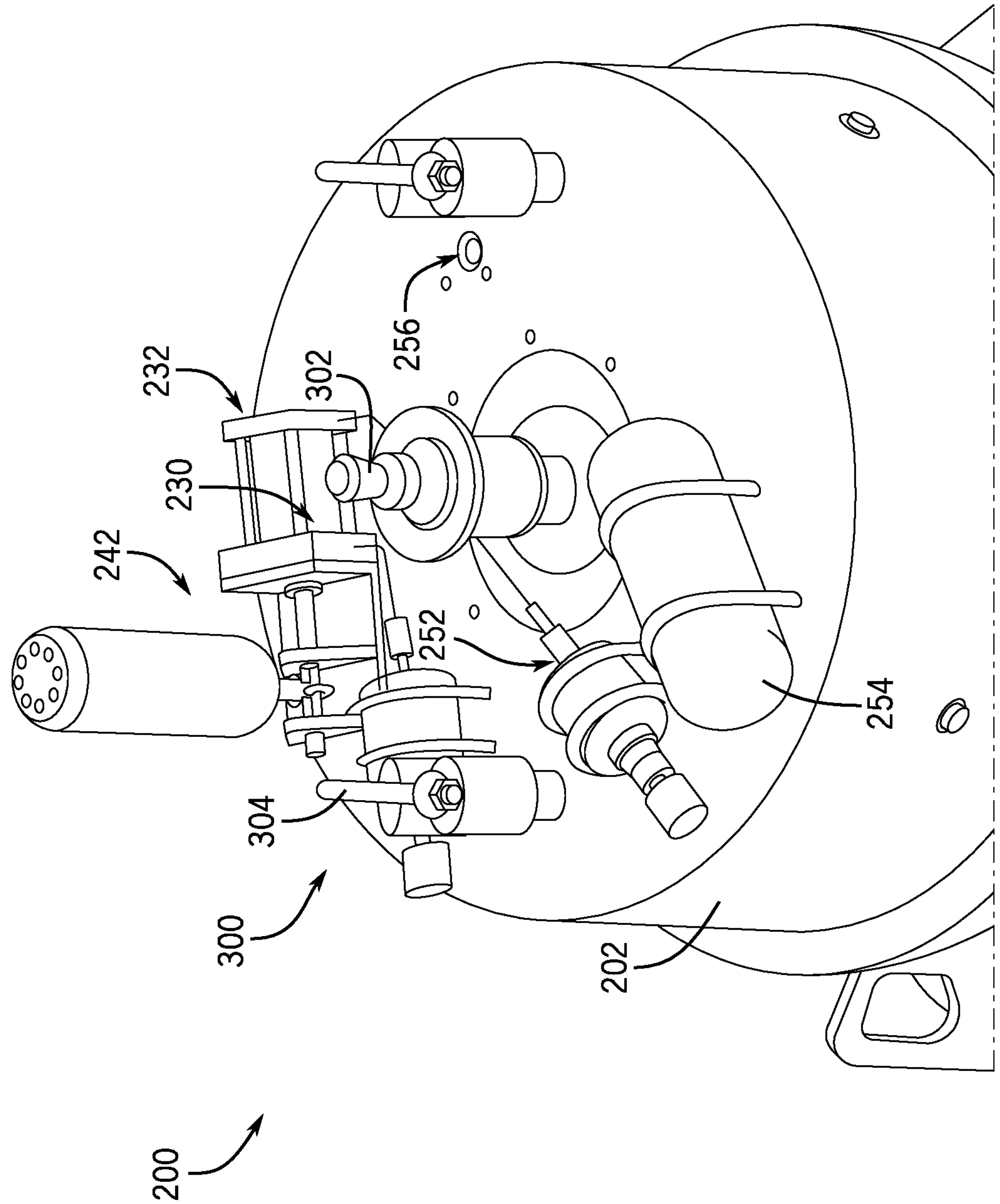
FIG. 3B is a perspective view of an embodiment of a leak detection and collection system, in accordance with embodiments of the present disclosure.

FIG. 3B is a perspective view of the top region 300 further illustrating positions of features such as the drive receptacle 302, override pulls 304, flow paths 230, 252, releasing mechanism 232, and accumulator 252, among other features. As noted, various locations are provided by way of non-limiting examples and features may be in different positions, positioned within the cap, and/or eliminated.

Embodiments of the present disclosure may overcome problems with existing containment and leak detection systems. For example, various embodiments provide containment of leaked fluids that are used to detect the leak, rather than only recognizing the leak after the fluid has leaked into the surrounding environment. Furthermore, systems and methods provide a proactive/preventative detection of leaked well fluids prior to an environmental breach. These systems and methods may also incorporate a direct activation mechanism (e.g., the well fluids themselves are the motive force of the alert mechanism). Additionally, embodiments deploy a downhole mechanical packer in a subsea tree or wellhead casing/housing setting, which is not a typical environment for such a tool and provides numerous advantages over existing techniques. Furthermore, various embodiments may utilize one or more ROV drive receptacles and power screw to set an elastomeric packer sealing sub, thereby enabling sealing where a smooth sealing surface may not be available.

Systems and methods may include a locking or weight-set cap that is deployed onto a well, by actuating dogs or clamp segments with hydraulic oil via a dual-port hot stab and is then isolated (e.g., such as via a quarter turn subsea needle valve) or by other mechanical means. Embodiments may include a polymeric packer seal sub, which may include PEEK or similar plastic scraper rings in addition to rubber packer elements, attached to and deployed with the cap. The packer seal may be enlarged to fill the bore and seal off the well. The same hot stab may be used to inject corrosion inhibitor chemicals into a cavity above a casing or tubing hanger. If there is a leak from the well, pressure will begin to build underneath the seal sub until such time as a spring in a release pin piston is overcome, at which point the pin will retract, releasing a connection, such as a padeye style connection, at a bottom end of a buoyancy unit. A buoy may release and raise to the surface of the seawater. Upon surface, an internal beacon may transmit a signal to its accompanying satellite system for messaging the well identification details and GPS signaling so that it can be located and retrieved. Thereafter, if pressure continues to build within the subsea part of the system, a check valve may vent once its cracking pressure is reached, allowing fluid to be redirected to a bladder accumulator, sufficiently sized to allow the well operator enough time to put in place mitigations for well containment.

Various embodiments of the present disclosure provide advantages over existing leak monitoring systems. By way of example, the present disclosure uses a packer seal assembly rather than a typical metal-to-metal sealing arrangement. This provides advantages in older subsea wells, which may not have suitable sealing surfaces due to damage, corrosion, erosion, or original machining errors. Additionally, embodiments deploy a drive screw, using a thread such as ACME or STUB ACME with a trapezoidal thread form that has a shallow enough itch to prevent the seal from inadvertently backing off and releasing the seal. Furthermore, embodiments may deploy a latch or lock to prevent backing off. Embodiments also provide for tuning of the system by adjusting set pressures for various components. Systems and methods provide improvements over more complex systems, which may deploy electronic signals, which may necessitate further equipment such as subsea batteries, sensors, control systems, switches, and the like.

Figure 4:
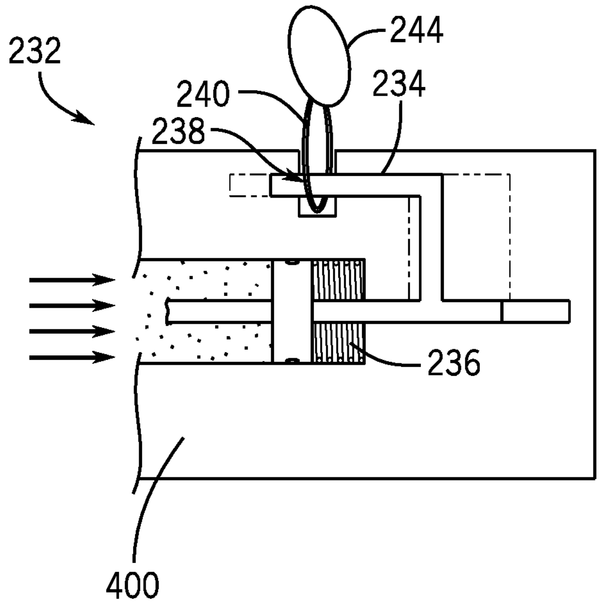
FIG. 4 is a schematic cross-sectional view of an embodiment of a release mechanism, in accordance with embodiments of the present disclosure.

FIG. 4 is a cross-sectional view of an embodiment of the release mechanism 232, which may be used with various embodiments. Various embodiments of the present disclosure may include a directly pressure actuated release mechanism that includes a spring detent, as an example. In at least one embodiment, a tunable pressure set screw and piston/sliding o-ring seal may be utilized. As shown in this example, the pin 234 is coupled to a piston 400. The biasing member 236 may be arranged to bias the piston 400, and as a result the pin 234, in a position to maintains the pin 234 within the slot 238 of the retainer 240, thereby keeping the alert system 242 coupled to the cap 202. Upon application of sufficient pressure to the piston 400, the spring force is overcome, thereby driving the piston 400, and as a result the pin 234, out of the slot 238, thereby releasing the retainer 240.

Embodiments of the present disclosure may utilize various components including, but not limited to the cap 202.

The cap 202 may incorporate features of one or more subsea tree debris caps, connectors, or test cap fixtures. As a non-limiting example, the cap may have pressure ratings of approximately 1,000 psi; 5,000 psi; 10,000 psi; 15,000 psi or any reasonable pressure rating. The cap 202 may not be intended to be used as a well barrier, but rather, as an early detection and warning system to permit later, more extensive work. However, the cap 202 and associated system may be a barrier in other embodiments. As noted above, the cap 202 may be deployed in a variety of different sizes and configurations. Additionally, while not illustrated herein, the cap 202 may include a variety of components to facilitate operation, such as lifting devices, grab bars, anodes, environment appropriate paint, and other features.

The seal sub 212 may be capable of dealing with some remaining calcareous marine growth, erosion, corrosion, and damage to sealing areas and surfaces. Compliant elastomeric seals may be used with maximum expansion capability. As noted, the seal sub may be operated by compressing rubber elements (e.g., top to bottom) to cause radial outward expansion. These systems may further incorporate optional PEEK scraper seals to remove grease or other debris from the bore and to act as backup rings.

The activation mechanism 216 may be a mechanical drive screw assembly that includes a high axial thrust load power jack/load screw. Such a system may be formed from appropriate materials for the subsea environment, such as a stainless or duplex stainless steel and may include helix threads with a top end drive, including bearing assemblies, and torque interface.

The dual port hot stab receptable 256 may also include a mating hot stab and hydraulic flying lead, optional subsea needle valves, chemical injection capabilities, hydraulic flow lines, an ROV t-bar handle, and hard fittings.

The accumulator 254 may include a bladder type accumulator, suitable for subsea use, and oil/water service. A volume may be particularly selected based on operational factors. For example, the volume may be approximately 1 liter.

The release mechanism 232 (e.g., buoyancy release mechanism) may include a spring with a low stiffness tuned to an appropriate pressure, such as approximately 100 psi. The activation pressure may be below the crack pressure for the non-return valve 250 and may retract through a slot in the cap assembly in a pin and yoke arrangement.

The alert system 242 may include a buoyancy beacon assembly with a submersible satellite beacon, hermetically sealed casing, designed to continuously monitor for unplanned or accidental release of subsurface instrument moorings. The system may include a radio transceiver, a digital controller with GPS, one or more antennas, and a battery package. The system may be particularly selected for use in a subsurface environment. The buoyancy unit 244 may be a foam one-piece subsurface buoyancy module that has either neutral or positive buoyance in sea water.

Figure 5:
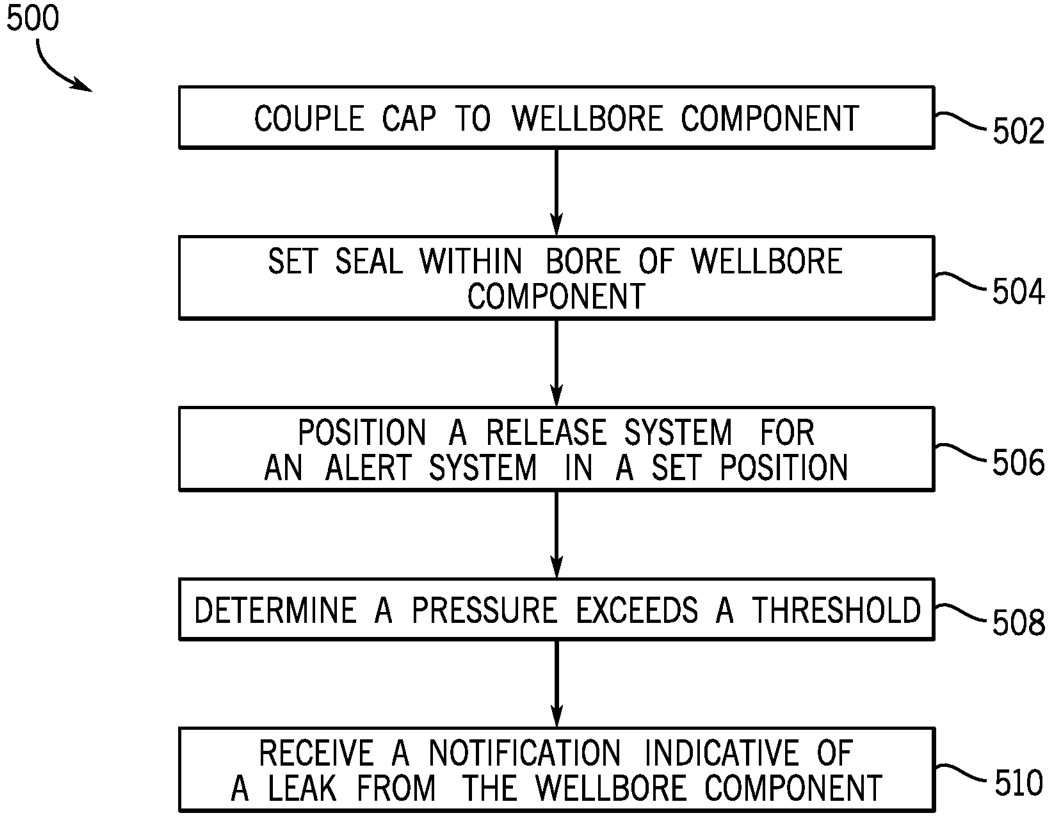
FIG. 5 is a flow chart of an embodiment of a method for detecting a wellbore component leak, in accordance with embodiments of the present disclosure.

FIG. 5 is a flow chart of an embodiment of method 500 for detection and notification of wellbore leaks. It should be appreciated that for this method, and all methods described herein, that the operations may be performed in a different order, or in parallel, unless otherwise specifically stated, and moreover, that there may be more or fewer steps. In this example, a cap is coupled to a wellbore component 502. For example, the cap may be deployed to a wellbore, such as one associated with an abandoned well, and may be coupled to one or more wellbore components, such as a wellhead, tree, BOP, and/or the like. In at least one embodiment, coupling the cap to the wellbore component may include activating one or more coupling systems, such as dogs, to engage the wellbore component.

In at least one embodiment, a seal may be set within the wellbore component 504. The seal may correspond to a packer that is activated within a bore of the wellbore component. In at least one embodiment, the packer may include one or more elastomeric components to facilitate engagement with and coupling to sealing surfaces that may be damaged and that would otherwise be challenging to effectively seal against other sealing systems, such as metal-to-metal seals. However, various embodiments may also, or alternatively, include metal-to-metal seals.

Various embodiments may include one or more alert systems to provide a notification regarding leakage associated with the wellbore component. The alert system may include a release mechanism that may be positioned in a set position 506. For example, a spring may be arranged to bias a pin to a first position. A side of the pin may be exposed to pressure below the seal, such as via one or more flow paths, and the spring may be configured to block release of a notification device until a particular pressure applied to the pin. In at least one embodiment, it may be determined that the pressure within the wellbore component exceeds a threshold 508. This pressure may correspond to pressure below the seal and may be directed toward the release system via one or more flow paths. The determination may be made passively, such as by evaluating a position of the release system, wherein a set position illustrates the pressure is below a threshold and a released position illustrates the pressure has exceeded the threshold. In various embodiments, a notification may be received indicative of a leak from the wellbore component 510. For example, upon reaching the threshold, the notification unit may be released and transmit a signal, such as via a beacon, regarding the release, which may cause an operator to plan intervention activities at the associated wellbore.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A leak detection and collection system, comprising:

a cap configured to couple to a wellbore component associated with a well;

an alert system removably coupled to the cap;

a packer coupled to the cap and extending into a bore of the wellbore component, the packer being actuated to seal against the wellbore component and to block flow through the bore;

a release mechanism coupled to the alert system;

a first flow path extending through the packer, the first flow path to direct flow to the release mechanism;

an accumulator; and a second flow path to direct flow to the accumulator;

wherein the release mechanism is activated at a first pressure above a first threshold to release the alert system from the cap and the second flow path directs flow to the accumulator at a second pressure above a second threshold.

2. The leak detection and collection system of claim 1, further comprising:

a one-way valve along the second flow path, the one-way valve operating at a set pressure equal to the second threshold to block flow below the second threshold and to permit flow above the second threshold.

3. The leak detection and collection system of claim 1, further comprising:

a hydraulic circuit to drive a hydraulic fluid toward a coupler of the cap, the coupler securing the cap to the wellbore component.

4. The leak detection and collection system of claim 3, wherein the coupler includes a set of subsea connector dogs.

5. The leak detection and collection system of claim 1, further comprising:

an activation mechanism associated with the packer, the activation mechanism including a drive screw to axially compress the packer so that the packer radially expands against the wellbore component.

6. The leak detection and collection system of claim 1, wherein the packer includes a polymer.

7. The leak detection and collection system of claim 1, wherein the alert system further comprises:

a buoyancy unit; and a satellite beacon, the satellite beacon transmitting information associated with a location of the wellbore component.

8. The leak detection and collection system of claim 1, wherein the first pressure is downhole pressure from the well.

9. The leak detection and collection system of claim 8, wherein the flow includes leaked fluid from the well.

* * * * *